US009429813B2

(12) United States Patent
Kaneda (10) Patent No.: US 9,429,813 B2
(45) Date of Patent: Aug. 30, 2016

(54) DEEP ULTRAVIOLET LASER GENERATION DEVICE AND LIGHT SOURCE DEVICE

(71) Applicant: OXIDE CORPORATION, Yamanashi (JP)

(72) Inventor: Yushi Kaneda, Yamanashi (JP)

(73) Assignee: OXIDE CORPORATION, Yamanashi (JP)

( * ) Notice: Subject to any disclaimer, the term of this patent is extended or adjusted under 35 U.S.C. 154(b) by 0 days.

(21) Appl. No.: 14/896,190

(22) PCT Filed: May 12, 2015

(86) PCT No.: PCT/JP2015/063556
§ 371 (c)(1),
(2) Date: Dec. 4, 2015

(87) PCT Pub. No.: WO2015/174388
PCT Pub. Date: Nov. 19, 2015

(65) Prior Publication Data
US 2016/0116822 A1    Apr. 28, 2016

(30) Foreign Application Priority Data

May 15, 2014  (JP) ................................ 2014-101102

(51) Int. Cl.
*H01S 3/30*    (2006.01)
*G02F 1/37*    (2006.01)
(Continued)

(52) U.S. Cl.
CPC ............. *G02F 1/37* (2013.01); *H01S 3/06754* (2013.01); *H01S 3/109* (2013.01); *H01S 3/10092* (2013.01); *H01S 3/1608* (2013.01); *H01S 3/1616* (2013.01); *H01S 3/23* (2013.01)

(58) Field of Classification Search
CPC .... H01S 3/23; H01S 3/10092; H01S 3/1616; H01S 3/1608
USPC ....................................... 372/6, 21
See application file for complete search history.

(56) References Cited

U.S. PATENT DOCUMENTS 6,181,461 B1    1/2001  Wada et al.
7,627,007 B1 *  12/2009  Armstrong ............ G02F 1/3501
                                                       372/21

(Continued)

FOREIGN PATENT DOCUMENTS

JP    2007-086108 A    4/2007
JP    2013-156448 A    8/2013

OTHER PUBLICATIONS

Gapontsev, D. et al., "20W single-frequency fiber laser operating at 1.93 um," Conference on Lasers and Electro-Optics—CLEO 2007, pp. 1-2, Baltimore, MD, May 6-11, 2007.
Sakuma, J., "Generation of all-solid-state, high-power continuous-wave 213-nm light based on sum-frequency mixing in $CsLiB_6O_{10}$", Optics Letters 29(10):1096-1098, May 15, 2004.
(Continued)

*Primary Examiner* — Tuan Nguyen
(74) *Attorney, Agent, or Firm* — Seed IP Law Group PLLC (57) ABSTRACT

In one embodiment, the present disclosure provides a deep ultraviolet laser generation device 1000 having a first laser source 100 at a first wavelength between 1.87 μm and 2.1 μm, a second laser source 200 at a second wavelength between 1.53 μm and 1.57 μm, a nonlinear wavelength conversion element 3 for generating near-infrared light 31 at a wavelength between 841 nm and 899 nm through a sum-frequency mixing (SFM) process, a nonlinear wavelength conversion element 4 for generating blue light 41 at a wavelength between 420 nm and 450 nm from the near-infrared light through a second harmonic generation (SHG) process, and a third nonlinear wavelength conversion element 5 for generating deep ultraviolet light 51 at a wavelength between 210 nm and 225 nm from the blue light, through another SHG process. The first laser source may be a thulium-doped laser source or a thulium-doped fiber source, and the second laser source may be a semiconductor laser source, an erbium-doped fiber source, or an erbium/ytterbium-doped fiber source.

12 Claims, 6 Drawing Sheets

(51) Int. Cl.
*H01S 3/067* (2006.01)
*H01S 3/109* (2006.01)
*H01S 3/16* (2006.01)
*H01S 3/10* (2006.01)
*H01S 3/23* (2006.01)

(56) References Cited

U.S. PATENT DOCUMENTS 8,503,068 B2 * 8/2013 Sakuma ............ G02F 1/3534
359/328
2012/0026578 A1 2/2012 Sakuma

OTHER PUBLICATIONS

Kozlovsky, W. J. et al., "Efficient Second Harmonic Generation of a Diode-Laser-Pumped CW Nd: YAG Laser Using Monolithic MgO: $LiNbO_3$ External Resonant Cavities," IEEE Journal of Quantum Electronics 24(6):913-919, Jun. 1988.

Kaneda, Y. et al., "Theoretical treatment, simulation, and experiments of doubly resonant sum-frequency mixing in an external resonator," Applied Optics 36(30):7766-7775, Oct. 20, 1997.

Urata, Y. et al., "808-nm diode-pumped continuous-wave $Tm:GdVO_4$ laser at room temperature," Applied Optics 44(15):3087-3092, May 20, 2005.

Spiegelberg, C. et al., "Low-Noise Narrow-Linewidth Fiber Laser at 1550 nm (Jun. 2003)," Journal of Lightwave Technology 22(1):57-62, Jan. 2004.

* cited by examiner

DEEP ULTRAVIOLET LASER GENERATION DEVICE AND LIGHT SOURCE DEVICE

BACKGROUND

1. Technical Field

The present disclosure relates to a laser generation device and laser light source device. More specifically, the present disclosure relates to a laser generation device and laser light source device for producing a continuous-wave laser of deep ultraviolet (deep-UV, or DUV) at a wavelength around 213 nm by using nonlinear wavelength conversion techniques.

2. Description of the Related Art

Laser sources using wavelength conversion by nonlinear materials are now widely deployed into industry; however, they still suffer from reliability issues. Limiting factors to the reliability include damage and/or degradation in nonlinear optical crystal elements used for wavelength conversion. The damage/degradation comes from small spot size of the laser light focused onto the crystal; it follows that, even a minor damage/degradation can cause significant decrease in efficiency because the conversion takes place in an optical resonator. When the process uses light at infrared to visible range for the fundamental wave for generating the ultraviolet light, damage caused by high photon energy of the ultraviolet light is significant.

Damages in wavelength conversion elements are usually caused by the ultraviolet light, which gives rise to optical loss for the fundamental light to be used as input to the elements. This phenomenon would be understood from the fact that the photon energy increases in an inversely proportional manner to the wavelength in the ultraviolet light and therefore the increased energy should have more significant impact on the material, and the fact that, the shorter the wavelength is, the more significant optical absorption becomes in most optical materials. Although the absorbed energy can be finally dissipated away in a form of heat, the impact onto the material during the process should be noticeable, and in most cases the optical elements suffer from degradation over time and result in poor performance. This impact is particularly significant in continuous-wave light sources, where the wavelength conversion is performed in optical resonators.

The continuous-wave deep ultraviolet (DUV) laser light can be obtained through a nonlinear wavelength conversion, in which the conversion efficiency is proportional to input power. A typical coefficient of the proportionality, or "normalized conversion efficiency," is of the order of $10^{-4}$ $W^{-1}$, suggesting that 100 W is required for the input in order to obtain 1 W for the output. Therefore it is particularly necessary for having practical conversion efficiency to dispose a nonlinear optical crystal, or a wavelength conversion element, into an optical resonator, thereby increasing light intensity of the input power at the element. Output power of 2 W at a wavelength of 266 nm has been achieved for a laser of continuous-wave operation when a laser of near-infrared range at a wavelength of 1.064 μm (1064 nm) is adopted for a fundamental wave, wherein the wavelength of 266 nm corresponds to the fourth harmonic of the fundamental, that is, a second harmonic of a wavelength of 532 nm, which is a second harmonic of the fundamental. Currently, the degradation of the nonlinear optical crystal is not negligible for such a high operation power as 2 W; therefore the degradation is a limiting factor to device life.

Industrial applications, such as inspection on semiconductor wafers or reticles, call for laser sources of shorter wavelength with higher output power. Among others, a laser source to generate light at a wavelength of 213 nm, the fifth harmonic of a near-infrared laser source of a wavelength of 1064 nm mentioned above, has been proposed as a promising candidate for inspection applications in next generation semiconductor industry, and numerous experiments have been reported. They adopt a sum-frequency mixing (SFM) process for producing the fifth harmonic from the fourth harmonic at a wavelength of 266 nm and the fundamental at a wavelength of 1064 nm. For experiments of pulsed sources there are a few reports based on SFM between the second harmonic and the third harmonic; however, when it comes to continuous-wave demonstrations there are only reports using the fourth harmonic and the fundamental for SFM. There is a report of demonstration of a continuous-wave (CW) 213 nm wavelength laser with output over 100 mW (Non-Patent Literature 1). This report discloses that, while an external resonator is kept at resonance by fundamental light at a wavelength of 1064 nm, a fourth harmonic at a wavelength of 266 nm is incident with tight focus into a nonlinear crystal, where the beam of 266 nm overlaps with that of 1064 nm resonator mode.

However, in such apparatus, the laser light at a wavelength of 266 nm will have very high optical power density (intensity) in the wavelength conversion elements. Because requests from the industry for such laser sources call for the output powers of the order of 1 W with continuous-wave operation at 213 nm, at least several watts of 266 nm light should be focused tightly onto the wavelength conversion element. This gives rise to serious concern on the degradation of the elements caused by such strong intensity of the ultraviolet light not only of the fifth harmonic generated, but also of the fourth harmonic focused tightly.

CITATION LISt

Each of the following references is incorporated herein, in their entirety:

Non Patent Literature 1

J. Sakuma, Y. Asakawa, T. Imahoko, and M. Obara, "Generation of all-solid-state, high-power continuous-wave 213-nm light based on sum-frequency mixing in $CsLiB_6O_{10}$," Optics Letters 29, 1096-1098 (2004).

Non Patent Literature 2

W. J. Kozlovsky, C. D. Nabors, and R. L. Byer, "Efficient second harmonic generation of a diode-laser-pumped CW Nd:YAG laser using monolithic $MgO:LiNbO_3$ external resonant cavities," IEEE Journal of Quantum Electronics QE-24, 913-919 (1988).

Non Patent Literature 3

Y. Kaneda and S. Kubota, "Theoretical treatment, simulation, and experiments of doubly resonant sum-frequency mixing in an external resonator," Applied Optics 36, 7766-7775 (1997).

Non Patent Literature 4

Y. Urata and S. Wada, "808-nm diode-pumped continuous-wave $Tm:GdVO_4$ laser at room temperature," Applied Optics 44, 3087-3092 (2005).

Non Patent Literature 5

C. Spiegelberg, J. Geng, Y. Hu, Y. Kaneda, S. Jiang, and N. Peyghambarian, "Low-noise narrow-linewidth fiber laser at 1550 nm (June 2003)," IEEE Journal of Lightwave Technology 22, 57-62 (2004).

Non Patent Literature 6

D. Gapontsev, N. Platonov, M. Meleshkevich, O. Mishechkin, O. Shkurikhin, S. Agger, P. Varming, and J. H. Poylsen, "20 W single-frequency fiber laser operating at 1.93 um," in Conference on Lasers and Electro-Optics, 2007 (CLEO 2007), paper CFI5 (2007).

BRIEF SUMMARY

Despite the importance for the industrial applications, fundamental light sources of wavelength around 1064 nm, which is suitable for generating 213 nm continuous-wave laser light with output power of 1 W or more, has been substantially limited to neodymium-doped (Nd-doped) or ytterbium-doped (Yb-doped) lasers. Moreover, paths to the wavelength of 213 nm from such lasers are practically limited to fifth harmonic generation from such lasers, that is, a sum frequency mixing process using the fourth harmonic and the fundamental.

In addition to the wavelength selection range and maximum output power capability limitations, the degradation of the wavelength conversion element is also a limiting factor to the output power of the laser source at 213 nm, as mentioned earlier. In a conventional fifth harmonic generation, the crystal of the wavelength conversion element for the final stage SFM is irradiated with a high density ultraviolet light at the fourth harmonic wavelength. This leads to noticeable degradation of the wavelength conversion element itself, which affects reliability of the laser sources of the nonlinear wavelength conversion type.

The present disclosure solves at least one of the problems mentioned above, and, by substantially extending the life of a DUV laser generation device, it contributes to development of a highly practical DUV laser generation device and light source device.

To solve the problems mentioned above, the present disclosure provides a scheme for generating a DUV light at around 213 nm without producing other DUV light than output one. Since damage or degradation of optical elements is effectively prevented in the nonlinear wavelength conversion element, it is possible to manufacture a DUV laser generation device and light source device with improved reliability.

That is, in one aspect is the present disclosure provides a deep ultraviolet laser generation device comprising: a first laser source of a thulium-doped laser source or a thulium-doped fiber source, the first laser source emitting light at a first wavelength, wherein the first wavelength is a wavelength between 1.87 μm and 2.1 μm; a second laser source of a semiconductor laser source, an erbium-doped fiber source, or an erbium/ytterbium-doped fiber source, the second laser source emitting light at a second wavelength, wherein the second wavelength is a wavelength between 1.53 μm and 1.57 μm; a first nonlinear wavelength conversion element for generating near-infrared light at a wavelength between 841 nm and 899 nm from the light at the first wavelength and the light at the second wavelength through a sum-frequency mixing (SFM) process; a second nonlinear wavelength conversion element for generating blue light at a wavelength between 420 nm and 450 nm, from the near-infrared light through a second harmonic generation (SHG) process; and a third nonlinear wavelength conversion element for generating deep ultraviolet light at a wavelength between 210 nm and 225 nm from the blue light through an SHG process.

In the above-mentioned aspect, the DUV light at a wavelength around 213 nm is generated through a second harmonic generation (SHG) process from blue light at a wavelength around 426 nm. The blue light is generated through an SHG process from near-infrared light at a wavelength around 852 nm. Then, the near-infrared light is obtained through a sum-frequency mixing (SFM) process that mixes a thulium-doped solid-state laser source or a thulium-doped fiber laser source (first laser source) at a wavelength around 1.91 μm (first wavelength) and an erbium-doped or an erbium/ytterbium-doped fiber source or semiconductor laser source (second laser source) at a wavelength around 1.54 μm (second wavelength). Each of these two laser sources has been developed recently either in a solid-state laser or fiber laser source, which can output as much as 10 W or more without any difficulty. As a result, it is possible for the near-infrared light at a wavelength around 852 nm or the blue light at a wavelength around 426 nm to have high optical outputs such as 10 W-class or more. It is to be noted that the "erbium/ytterbium-doped fiber source" in the present disclosure means a laser source whose laser medium is an optical fiber to which erbium (Er) and ytterbium (Yb) are co-doped. Also in the present disclosure, "fiber source" may include not only a light source of a fiber laser having laser gain medium and a laser resonator for lasing disposed therein, but a light source structure as well, in which output from a low power laser source is amplified by a fiber amplifier to provide required intensity from the laser light. For example, what is referred to as a thulium-doped fiber source may denote a light source of a fiber laser having an optical fiber with thulium-doped medium inside of a resonator structure, which is formed by a reflective fiber such as one equipped with fiber Bragg gratings, and a source that amplifies output from a low power laser source of non-fiber type by a fiber amplifier with thulium-doped medium as well. This nomenclature applies also for an erbium-doped or erbium/ytterbium-doped fiber source.

For the DUV laser generation device and light source device in the aforementioned aspect, it is possible to generate DUV laser light at a wavelength of ~213 nm, which light has been strongly demanded in the industry. It is possible for the light source at a wavelength of ~213 nm to have high output as much as 1 W or more. Even in such a case, optical material in the DUV laser generation device is irradiated with no other ultraviolet light than the final output at ~213 nm.

As mentioned earlier, the ultraviolet light at a wavelength around 213 nm based on the DUV laser generation device of the present disclosure is produced through SHG of a light source of visible (or blue) light at the wavelength around 426 nm. The blue light at around 426 nm has lower photon energy than that of the fourth harmonic at ~266 nm of the light source of 1.064 μm due to the longer wavelength and exhibits less absorption in optical materials accordingly. This ensures the present invention to have extremely less probability of causing damage in optical elements. In embodiments provided by the present disclosure, a continuous-wave single frequency blue light source of a wavelength around 426 nm with 3 W-5 W output power is provided, and the blue light at 426 nm is then directly used to generate DUV laser light at a wavelength of 213 nm through the SHG. Therefore, it is possible in accordance with aspects of the present disclosure to operate the generation of DUV light while preventing damage in the optical elements that might be caused by the DUV light, and it is possible to improve reliability of the DUV laser generation device, which results in longer life of the device. Thus, DUV laser generation device and light source device provided in the present disclosure are promising sources in the application field of semiconductor manufacturing process of 14 nm design-rule, which is the state-of-the-art semiconductor nanofabrication process at the time of the present disclosure, and in the application field of wafer and mask inspections for the next generation semiconductor manufacturing processes.

It should be noted that, in addition to the above-mentioned first and second wavelengths, the wavelengths for the near-infrared light at a wavelength around 852 nm, the blue light at a wavelength around 426 nm, and the DUV light at a wavelength around 213 nm may be referred to as the third, fourth, and fifth wavelengths respectively to keep the explanation consistent and straightforward. Moreover, the first-fifth wavelengths may be designated by Greek letter λ, such as the first wavelength λ1 and so forth.

In accordance with embodiments provided by the present disclosure, it is possible to provide a deep ultraviolet laser at a wavelength that corresponds to a fifth harmonic of the laser light source around 1.064 μm adopting neodymium or ytterbium, which wavelength is demanded in the industry. As a result, the present disclosure provides a continuous-wave deep ultraviolet laser having a short wavelength and high output power capability with high practicability thanks to its high stability and long product life.

DETAILED DESCRIPTION

An embodiment of the deep ultraviolet (DUV) laser generation device of the present disclosure is described below by referring to the drawings. In the following description, common parts or elements are indicated by common reference numerals over the entire drawings unless otherwise noted. In addition, each element in the drawings is not necessarily drawn to scale. In the description of the embodiments provided herein, any light is either laser light or coherent light that has been amplified from laser while keeping its coherence, if not otherwise specified, and a wavelength range of any light is not limited to visible range and may include infrared or ultraviolet range.

Figure 1:
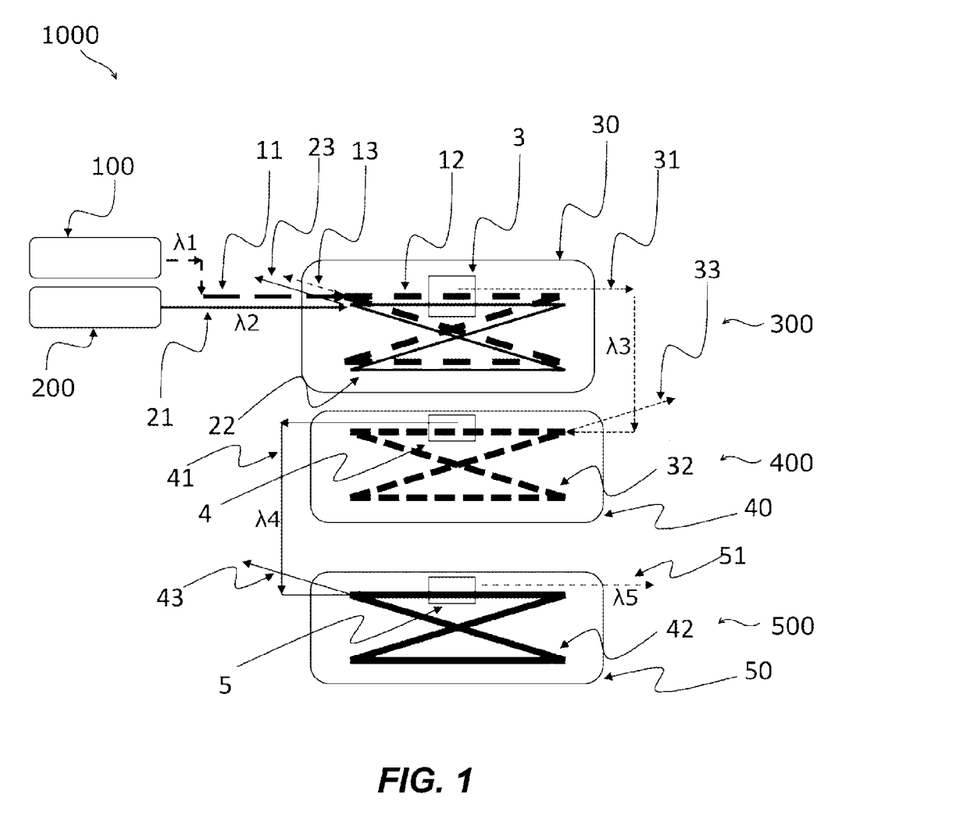
FIG. 1 is a schematic diagram of a DUV laser generation device for generating DUV light using a sum-frequency mixing process and dual-stages of second harmonic generation processes from beams of light emitted by the first wavelength source and the second wavelength source.

FIG. 1 shows an example structure of a DUV laser generation device 1000 for generating DUV light using a sum-frequency mixing process and dual-stage second harmonic generation (SHG) processes from beams of light emitted by sources of the first wavelength λ1 and second wavelength λ2. A DUV light 51 at a wavelength around 213 nm (fifth wavelength), which is output of the DUV laser generation device 1000, is generated from blue light 41 at a wavelength around 426 nm (fourth wavelength) in visible range through an SHG process at a third wavelength conversion unit 500. The blue light 41 is much less likely to cause damage or degradation to optical devices or elements than, for example, a DUV light at 266 nm, which is a fourth harmonic of commonly used 1.064 μm source. The blue light 41 is generated from near-infrared light 31 at a wavelength around 852 nm (third wavelength) through an SHG process at a second wavelength conversion unit 400. Furthermore, the near-infrared light 31 at a wavelength around 852 nm in the present embodiment is obtained from light 11 at a first wavelength around 1.91 μm and light 21 at a second wavelength around 1.54 μm through a sum-frequency mixing (SFM) process at a first wavelength conversion unit 300. The light 11 at the first wavelength and light 21 at the second wavelength are generated respectively by a first laser source 100 and a second laser source 200, where the first laser source 100 is a thulium-doped solid-state laser source or a thulium-doped fiber source, whereas the second laser source 200 is an erbium-doped or an erbium/ytterbium-doped fiber source or a semiconductor laser source.

The wavelengths in the DUV laser generation device 1000 of the present embodiment satisfy the following relationship:

$$1/\lambda 3 = 1/\lambda 1 + 1/\lambda 2,$$

$$\lambda 4 = \lambda 3/2, \text{ and}$$

$$\lambda 5 = \lambda 4/2.$$

These are directly reduced into the following relationship:

$$4/\lambda 5 = 1/\lambda 1 + 1/\lambda 2.$$

In these expressions, λ1 and λ2 are the first wavelength for light 11 generated by the first laser source 100 and the second wavelength for light 21 generated by the second laser source 200, which have approximate values of 1.91 μm and 1.54 μm, respectively. In addition, λ3 and λ4 are the wavelength of the near-infrared light 31 at a wavelength around 852 nm (third wavelength) and the wavelength of the blue light 41 at a wavelength around 426 nm (fourth wavelength), respectively. Similarly λ5 is the wavelength of the output, or the DUV light 51 at a wavelength around 213 nm (fifth wavelength).

Values required for laser power of the DUV laser generation device 1000 are described as follows. Let us assume that 10 mm-long BBO (β-Barium borate, β-BaB$_2$O$_4$) crystal is adopted for a third nonlinear wavelength conversion element 5 in the third wavelength conversion unit 500 and is positioned at beam waist inside of the optical resonator. Then normalized conversion efficiency of ~0.45×10$^{-4}$ W$^{-1}$ is obtained for the beam waist radius of 40 μm. If output of ~1 W is requested for the DUV light 51 at 213 nm, the output level ~3 W through 4 W is required for the blue light 41 at 426 nm according to input-output performance predicted by simulation, in which loss of the external resonator is assumed to be 0.5-2% and reflectivity of an input coupler mirror 301 (FIGS. 5 and 6) is assumed to be 98%. Note that the simulation scheme for the estimation in the above is disclosed in Non Patent Literature 2.

In the present embodiment, the blue light 41 at a wavelength around 426 nm is generated from the near-infrared light 31 at wavelength around 852 nm through the SHG at a second nonlinear wavelength conversion element 4 in a second wavelength conversion unit 400. The same estimation procedure as the simulation mentioned above reveals that ~10 W of 852 nm light is required for generating ~4 W output for the blue light 41 at around 426 nm.

The SFM process that utilizes a first nonlinear wavelength conversion element 3 in the first wavelength conversion unit 300 is carried out with a doubly-resonant SFM conversion for continuous-wave (CW) process, as an example. The doubly-resonant type SFM may be referred to as a dual-wavelength resonant type. It is found through the simulation that output powers of the first laser source 100 (at a wavelength of 1.91 μm) and the second laser source 200 (at a wavelength of 1.54 μm) required for generating 10 W for the 852 nm light are estimated to be approximately 8 W and 7 W, respectively (Non Patent Literature 3). In order for wavelength conversion process to take place inside of an external resonator for continuous-wave lights, each of the first laser source 100 and second laser source 200 needs to operate at a single-frequency for the above-mentioned output; however feasibility of such operation is not self-evident. Therefore, in the following description, practicable structures of the first laser source 100 and second laser source 200 are described in detail by way of the first laser source 100 as an example. For straightforward explanation the powers required for the first laser source 100 and second laser source 200 are both assumed to be ~10 W. However, this assumption is for the sake of explanation only and does not limit the scope of the present disclosure.

Figure 2:
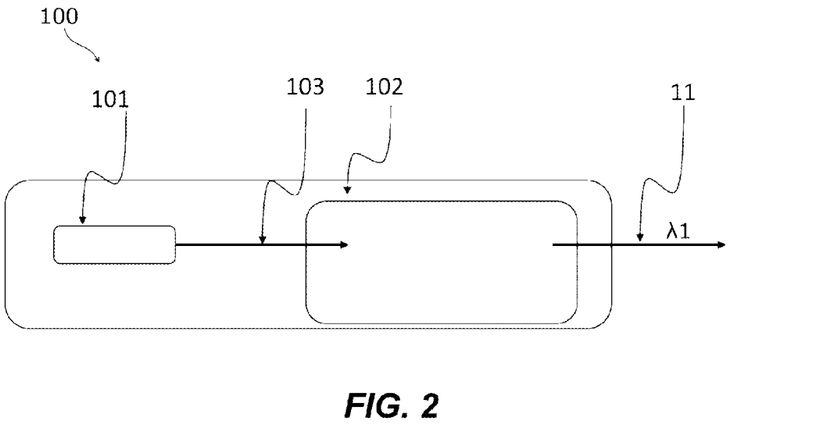
FIG. 2 is a schematic diagram of structure of continuous-wave solid-state laser source emitting light at a first wavelength, which is an example component of the first laser source.

FIG. 2 is a schematic diagram of structure of a continuous-wave solid-state laser source that emits the light 11 at the first wavelength λ1, which source is an example component of the first laser source 100. It schematically indicates structure of a 10 W-class single-frequency continuous-wave laser source that uses a seed laser source 101. The first laser source 100 is a 1.91 μm laser source, for example. What can be adopted for the first laser source 100 is a single-frequency seed laser source 101 with a few mW output, such as a semiconductor laser, a thulium-doped fiber laser, a thulium-doped solid-state laser or the like. Also the first laser source 100 may be realized by combining the seed laser output 103 with an injection-locked laser or thulium-doped fiber amplifier 102. The semiconductor laser or thulium-doped fiber laser may be capable of tuning its frequency. The injection-locked laser or the solid-state seed laser may be selected from ones having solid-state laser gain media of Tm:YVO$_4$, Tm:GdVO$_4$, Tm:Gd$_x$Y$_{1-x}$VO$_4$ (where 0<x<1), Tm:YAG (Yttrium Aluminum Garnet), Tm:GGG (Gadolinium Gallium Garnet), Tm:LuAG (Lutetium Aluminum Garnet) or the like.

Figure 3:
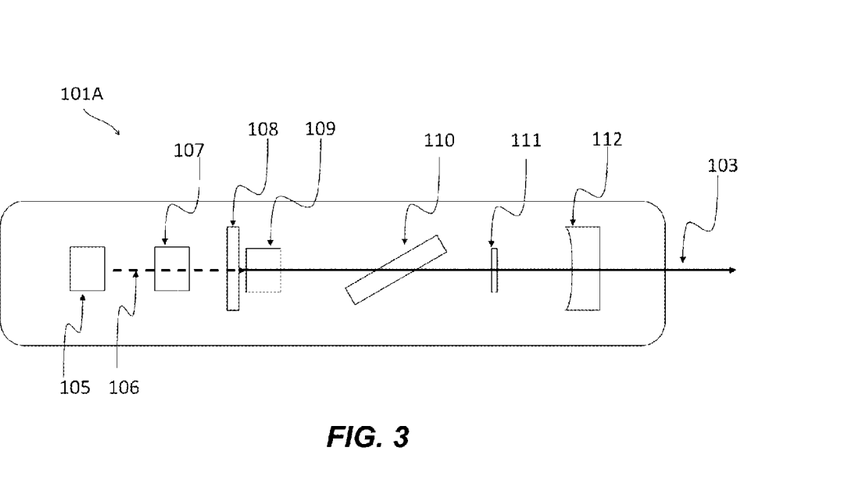
FIG. 3 is a schematic diagram of a solid-state laser source, which is an example component of a single-frequency seed laser source adopted for the first laser source.

FIG. 3 shows a solid-state laser source 101A that lases at a single-frequency for an example component of the single-frequency seed laser source 101 depicted in FIG. 2. Laser gain medium 109 in the solid-state laser source 101A may be any of the solid-state laser materials mentioned above. The laser gain medium 109 is pumped through the pump optics 107 by the optical pump beam 106 emitted by the optical pump source 105. In the solid-state laser source 101A, the laser gain medium 109 is pumped from an end surface on its optical axis. The resonator mirror 108, through which the optical pump beam 106 passes, exhibits high reflectivity for light at the lasing wavelength and high transmission for light at the pumping wavelength. Mirrors of such property include dielectric mirrors and are common for those skilled in the art. The resonator mirror 108 is faced oppositely to an output coupler mirror 112 while terminating the optical resonator and laser oscillation takes place between these mirrors. In addition to the laser gain medium 109, additional optical elements may be placed inside of the optical resonator. Since all materials mentioned above in respect of the laser gain medium 109 have relatively wide gain bandwidth, it might be impossible that the laser outputs at a desired wavelength or makes its oscillation in a single frequency so long as a simple oscillator including only the gain media is adopted. In such a case, a birefringent filter 110 may be placed inside of the optical resonator for allowing coarse tuning of the lasing wavelength, in which an arbitrary lasing wavelength within gain bandwidth can be selected into a narrow band lasing wavelength. On top of that, selecting a longitudinal mode of cavity by using an etalon 111, which is also placed additionally inside of the optical resonator, allows for a stable single-frequency lasing oscillation to take place. Output power of 400 mW or more at 1.915 μm has been observed in a report on an experiment (Non Patent Literature 4), in which case Tm:GdVO$_4$ is used for the laser gain medium in solid-state laser source. The output coupler mirror 112 may be mounted on a precision positioning device, not shown, to conduct fine control of cavity length of the optical resonator, thus providing fine tuning capability for the frequency of light at lasing oscillation. When lasing oscillation takes place in the solid-state laser source 101A, the seed laser output 103 is radiated through the output coupler mirror 112.

Figure 4:
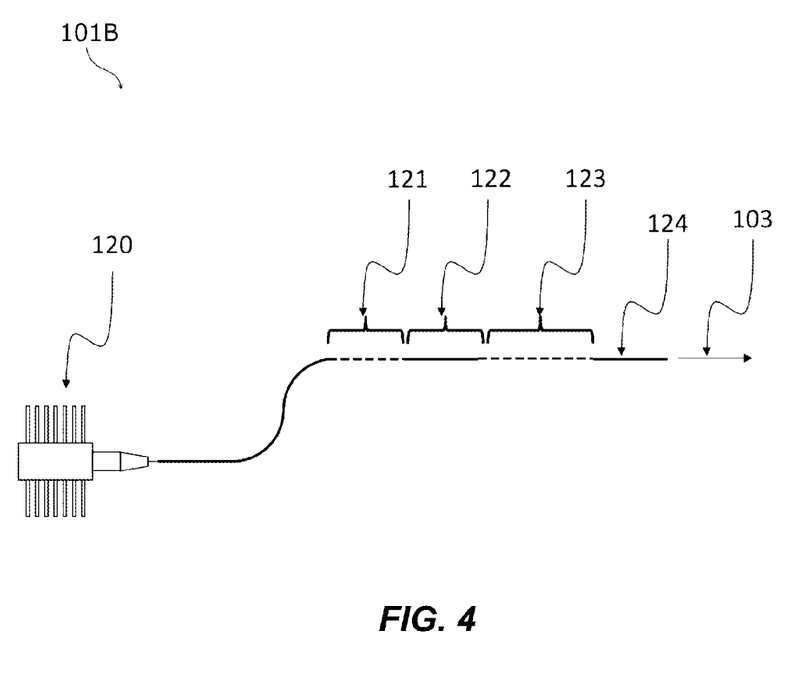
FIG. 4 is a schematic diagram of a fiber laser source, which is an example component of a single-frequency seed laser source adopted for the first laser source.

FIG. 4 shows the schematic of a fiber laser source 101B, which is another example component of a single-frequency seed laser source 101 depicted in FIG. 2. The optical resonator in the single-frequency fiber laser source 101B is configured between a high-reflection fiber Bragg grating (HR-FBG) 121 and an output coupling fiber Bragg grating (output coupling FBG) 123, both being fusion spliced to a laser gain fiber 122, where the laser oscillation takes place between these two FBGs. The laser gain fiber 122 is, for example, a thulium-doped fiber, and is pumped by a semiconductor laser 120 of a wavelength ~800 nm. Such FBGs usually have a relatively narrow reflection bandwidth. In the present structure, HR-FBG 121 has a bandwidth of ~0.1 nm with very low reflectivity at the pumping light at a wavelength of ~800 nm. On the other hand, the output coupling FBG 123 is a partial reflector with the reflectivity of 50-90% with a typical reflection bandwidth ~0.05 nm-0.1 nm and is manufactured to reflect substantially the same wavelength as the HR-FBG 121. The cavity length of it is substantially the same as the length of the laser gain fiber 122, or several centimeters, making the longitudinal mode spacing comparable to the reflection bandwidth of the output coupling FBG 123. Therefore, the laser oscillator effectively supports only a few modes within the reflection bandwidth of the FBGs and, as a result, only a single mode of the lasing oscillation located at the highest reflectivity of the FBGs is allowed. Stable single-frequency lasing operation has been demonstrated in a similar configuration (Non Patent Literature 5). It is possible to perform tuning of the substantial optical length of the resonator if such a fiber oscillator is mounted on a piezoelectric electrostrictive element, providing the laser output with fine frequency tuning capability in the optical frequency. Light of stimulated emission from the laser oscillator is output as the seed laser output 103 from an output fiber 124. When the seed laser output 103 is used for the injection-locking of high power solid-state laser oscillator employing laser gain media similar to that in FIG. 2, a single-frequency light output is obtained. Alternatively, when the seed laser output 103 is combined with a high power fiber amplifier, the output may be increased while maintaining the single-frequency spectrum (Non Patent Literature 6).

The description of the first laser source 100 set forth while referring to FIGS. 2-4 is also true for the second laser source 200 (FIG. 1) without substantial change. It is possible to manufacture the second laser source 200 with a single-frequency, 10 W-class, and continuous-wave 1.54 µm laser source based on the same structure of the first laser source 100. When it comes to a seed source in the second laser source 200, a continuous-wave single-frequency seed laser source of several mW-class may be manufactured with erbium-doped or erbium/ytterbium-doped fiber oscillator, in a similar fashion having the same structure as one in FIG. 4, or a semiconductor laser. For the details, structures described for the seed laser source 101 in the first laser source 100 based on FIGS. 3 and 4 may be adopted.

The technologies for light sources, seed lasers, and amplifiers mentioned above are well established in the industry. The seed lasers for these semiconductor lasers or fiber lasers need to have appropriate frequency stability and narrow spectral bandwidth, and may have frequency tunability.

Figure 5:
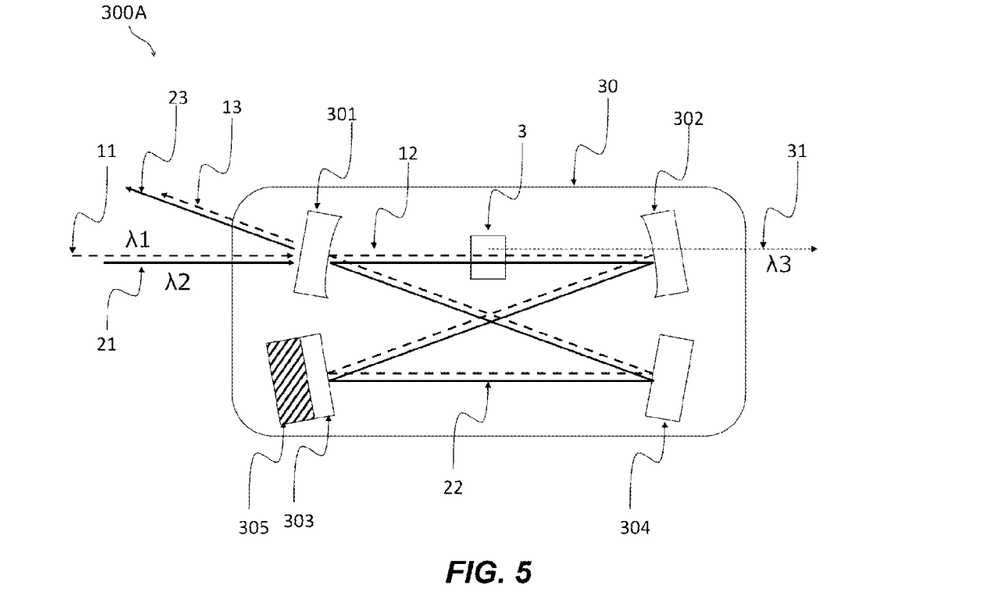
FIG. 5 is an outline schematic of a first wavelength conversion unit for generating near-infrared light at a third wavelength using the first wavelength and second wavelength light sources.
Figure 6:
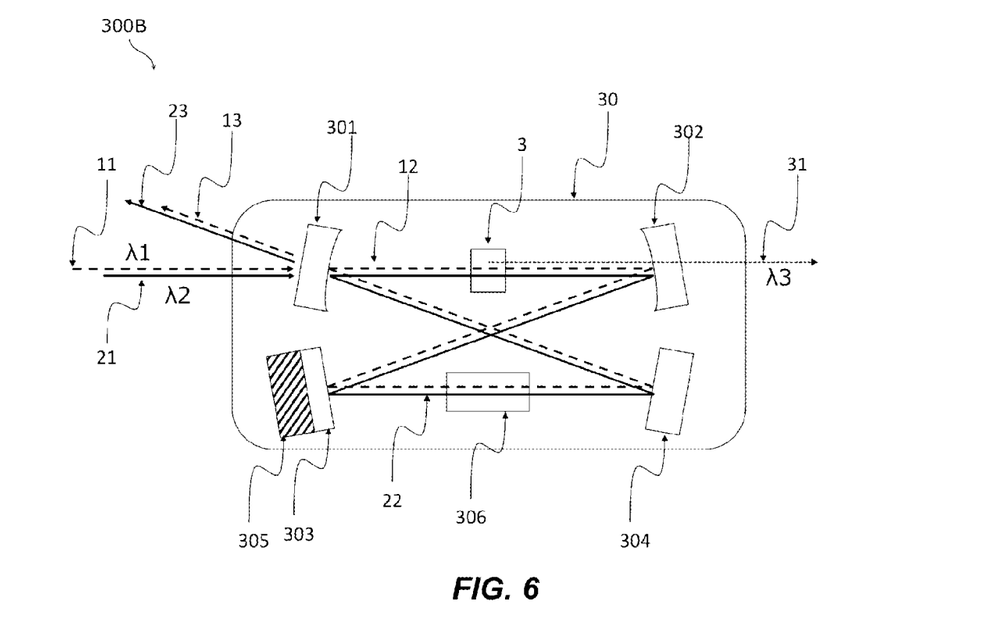
FIG. 6 is an outline schematic of a first wavelength conversion unit for generating near-infrared light at a third wavelength using the first wavelength and second wavelength light sources.

As shown in FIG. 1, the light 11 at the first wavelength and light 21 at the second wavelength respectively radiated by the first laser source 100 and the second laser source 200 are independently coupled to an external resonator 30 in the first wavelength conversion unit 300, and both are maintained at resonance. FIGS. 5 and 6 are outline schematics of first wavelength conversion units 300A and 300B for generating near-infrared light at a third wavelength λ3 from the first wavelength λ1 and second wavelength λ2 light sources.

In the first wavelength conversion unit 300, techniques to keep simultaneous resonance condition for the first and second wavelengths is roughly described into three typical cases. First one is in the case when both of the first laser source 100 and the second laser source 200 have their own frequency tuning capability, as illustrated with the first wavelength conversion unit 300A in FIG. 5, where each light frequency for each laser source is controlled to each of the resonant frequencies of the external resonator 30. In this technique, the reflected light 13 at the first wavelength λ1 emitted from the external resonator 30 is detected to generate an error signal to be fed back for tuning the frequency of the first laser source 100. Likewise, a reflection light 23 at the second wavelength λ2 emitted from the external resonator 30 is detected to generate another error signal to be fed back for tuning the frequency of the second laser source 200.

In the second technique, a laser source with tuning capability is adopted for one of laser sources 100 and 200, whereas another laser source without tuning capability is adopted for the other of the two sources as indicated in the first wavelength conversion unit 300A in FIG. 5. The frequency of the output light from the laser source with the tuning capability of the two is tuned to a resonant condition. This is performed in the same way as in the first technique. In the second technique, at least one of the input coupler mirror 301, reflective mirrors 302, 303, and 304 making the external resonator 30 (reflective mirror 303 in the case of FIG. 5) is mounted on a precision positioning device 305, making cavity length of the external resonator 30 controllable. As for the output light of the other laser source without tuning capability, the cavity length is controlled and tuned to integer multiples of its wavelength to maintain the resonance. This technique may be used for satisfying simultaneous resonance requirement for two wavelengths. For example, let us assume the first wavelength λ1 to be of the other laser without tuning capability, and the second wavelength λ2 to be of the other laser with tuning capability, respectively. In this case, an error signal generated from a detected reflection light 13 of the first wavelength λ1 emitted from the external resonator 30 is fed back to the precision positioning device 305 for tuning. On the other hand, another error signal generated from a detected reflection light 23 of the second wavelength λ2 emitted from the external resonator 30 is fed back for tuning the frequency of the laser source 200.

In the third technique, neither the first laser source 100 nor the second laser source 200 requires tuning capability. As depicted in the first wavelength conversion unit 300B in FIG. 6, output light from the one of the laser sources is kept tuned to a resonant condition according to the cavity length of the external resonator 30 by the reflective mirror 303 mounted on the precision positioning device 305. As for the output light of the other laser source, a phase dispersion compensation element 306 placed inside of the external resonator 30 is used for adjusting phase dispersion in the external resonator 30 so that the other output light is made resonant inside of the external resonator 30. As a result, two wavelengths satisfy the requirement of the simultaneous resonance. For example, an error signal generated from a detected reflection light 13 at the first wavelength λ1 emitted from the external resonator 30 is fed back for tuning with precision positioning device 305 for the resonator mirror thereon. On the other hand, another error signal generated from a detected reflection light 23 of the second wavelength λ2 emitted from the external resonator 30 is fed back for tuning, in which the phase dispersion by the phase dispersion compensation element 306 inside of the external resonator 30 is utilized for the tuning. The material of the phase dispersion compensation element 306 may include lithium niobate and lithium tantalate. Preferably, for enhancing the effect of phase dispersion compensation, the light 11 at the first wavelength and light 21 at the second wavelength, which are different with each other, are configured to be of two orthogonal polarizations so that beams of light with different wavelengths see different optical axes of the phase dispersion compensation element 306.

In either of the techniques described above, light beams at two wavelengths are maintained simultaneously at a resonance inside of the external resonator 30. Therefore, the light 12 at the first wavelength (1.91 µm) and light 22 at the second wavelength (1.54 μm) with considerably enhanced intensities are presented inside of the external resonator 30 at a time, and an SFM element (first nonlinear wavelength conversion element 3) can be irradiated with the light beams at the same time. This allows efficient generation of the near-infrared light 31 at a wavelength of ~852 nm corresponding to the summed frequency.

The first nonlinear wavelength conversion element 3 placed inside of the external resonator 30 where the simultaneous resonance takes place may be a nonlinear optical element, such as KTP (potassium titanyl phosphate, $KTiOPO_4$), LN (lithium niobate, $LiNbO_3$), PPLN (periodically poled lithium niobate), PPLT (periodically poled lithium tantalate), KN (potassium niobate, $KNbO_3$), KTA (potassium titanyl arsenate, $KTiOAsO_4$), RTA (rubidium titanyl arsenate, $RbTiOAsO_4$), RTP (rubidium titanyl phosphate, $RbTiOPO_4$) or the like. For any type of such materials, the first nonlinear wavelength conversion element 3 is chosen to satisfy phase matching condition for efficient SFM performance by taking the polarizations of beams of light 12 and 22 at the first and second wavelengths in the external resonator 30 into account. When above-mentioned conditions are satisfied, it is possible to generate the near-infrared light at a wavelength of ~852 nm efficiently.

For a reliable estimation of the intensity value of the near-infrared light 31 obtained through the SFM process, simulation has been conducted based on disclosure of Non Patent Literature 3. In the simulation, following realistic parameters are assumed: Power P1 at 1.91 μm and power P2 at 1.54 μm are P1=P2=10 W. A normalized conversion efficiency is $\gamma SFM=1\times10^{-4}$ $W^{-1}$, and output power P3 at summed frequency satisfies a relationship P3=γSFM×P1× P2. Moreover, an optical loss δ1 at 1.91 μm and optical loss δ2 at 1.54 μm, both of the resonator 30, are δ1=δ2=0.5%.

Figure 7:
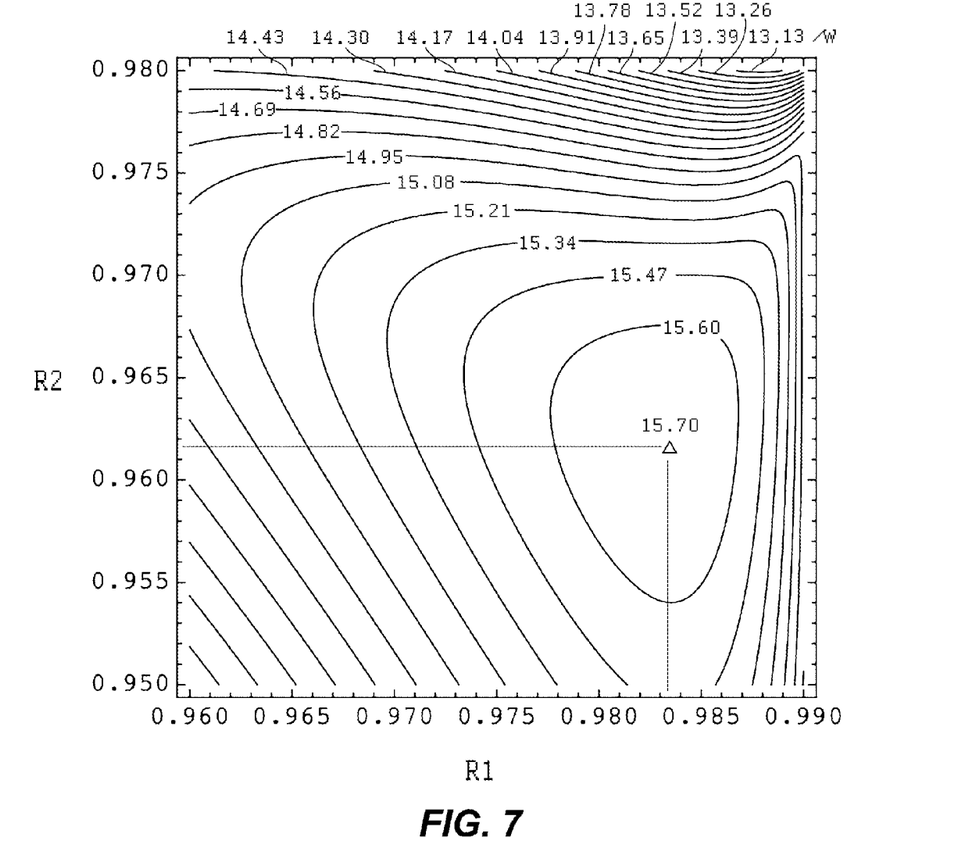
FIG. 7 is a simulation result shown in contour plot indicating output after the sum-frequency mixing process from the first wavelength conversion unit as a function of reflectivity values of the input coupler mirrors at two wavelengths λ1 and λ2.

FIG. 7 shows a simulation result for the parameters mentioned above of the output power after the SFM process of the first wavelength conversion unit 300 in contour plot as a function of reflectivity value R1 at the first wavelength, 1.91 μm, of input coupler mirror 301 and reflectivity value R2 at the second wavelength, 1.54 μm of the input coupler mirror 301. Nearly 16 W of the output for 852 nm light is expected with a proper choice of the reflectivity values for the input coupler mirror 301, as can be seen from the depiction. Based on the assumed parameters as in the above, the optimum result is obtained at a point around R1=98% and R2=96%.

Figure 8:
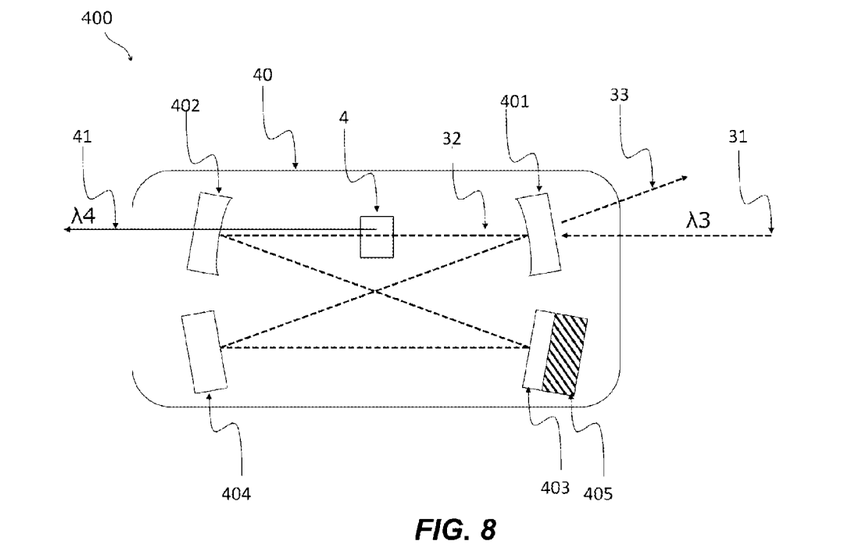
FIG. 8 is an outline schematic of a second wavelength conversion unit for generating blue light at fourth wavelength through a second harmonic generation process from the near-infrared light at the third wavelength.

The generated near-infrared light 31 at 852 nm (third wavelength) is to be received by the second wavelength conversion unit 400 for SHG shown in FIG. 8 to generate the blue light 41 at 426 nm (fourth wavelength). Then the blue light 41 is to be received by the third wavelength conversion unit 500 for SHG shown in FIG. 9 to generate the DUV light 51 at 213 nm (fifth wavelength).

Figure 9:
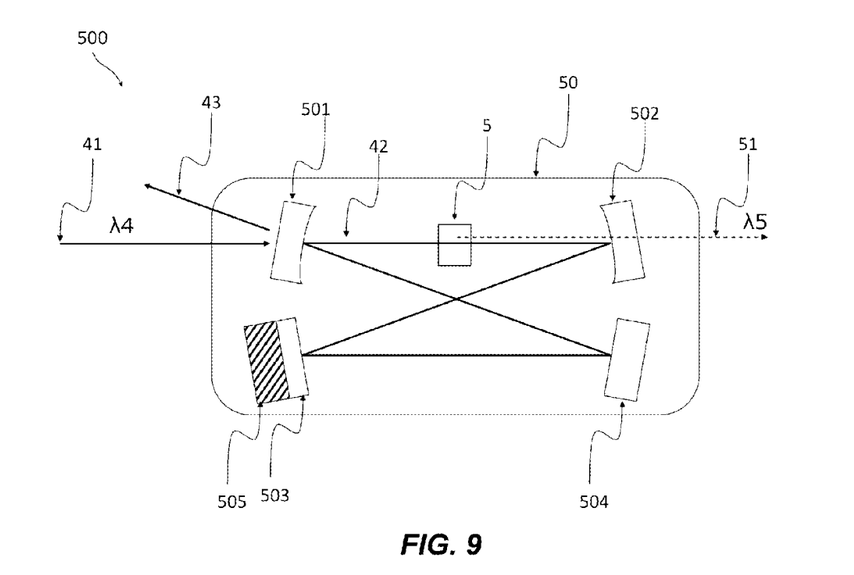
FIG. 9 is an outline schematic of a third wavelength conversion unit for generating DUV light at fifth wavelength through a second harmonic generation process from the blue light at the fourth wavelength.

FIG. 8 is an outline schematic of the second wavelength conversion unit 400 for generating blue light 41 at a fourth wavelength λ4 through SHG from the near-infrared light 31 at the third wavelength λ3. FIG. 9 is an outline schematic of the third wavelength conversion unit 500 for generating DUV light 51 at a fifth wavelength λ5 through SHG from the blue light 41 at the fourth wavelength λ4. In the second wavelength conversion unit 400, the second nonlinear wavelength conversion element 4 is placed inside of an external resonator 40 formed by an input coupler mirror 401, reflective mirrors 402, 403, and 404, where the second nonlinear wavelength conversion element 4 is irradiated with a near-infrared light 32 at the third wavelength. The near-infrared light 32 at the third wavelength is light at resonance in the external resonator 40 fed by the near-infrared light 31 at the third wavelength λ3 through the input coupler mirror 401. At least one reflector, or reflective mirror 403, is mounted on the precision positioning device 405 so that the resonance is maintained. For this purpose, the error signal derived from a reflection light 33 is fed back for tuning with the precision positioning device 405. Material of the second nonlinear wavelength conversion element 4 can be selected from, in addition to those for the first nonlinear wavelength conversion element 3 described above, BBO ((3-Barium borate), CLBO ($CsLiB_6O_{10}$), KBBF ($KBe_2BO_3F_2$), RBBF ($RbBe_2BO_3F_2$), and LBO ($LiB_3O_5$). Likewise, in the third wavelength conversion unit 500, the third nonlinear wavelength conversion element 5 is placed inside of the external resonator 50 formed by an input coupler mirror 501, reflective mirrors 502, 503, and 504, where the third nonlinear wavelength conversion element 5 is irradiated with the blue light 42 at the fourth wavelength. The blue light 42 at the fourth wavelength is light at resonance in the external resonator 50 fed by the blue light 41 at the fourth wavelength λ4 through the input coupler mirror 501. At least one reflector, or the reflective mirror 503, is mounted on the precision positioning device 505 so that the resonance is maintained. For this purpose, the error signal derived from a reflection light 43 is fed back for tuning with the precision positioning device 505. Note that typical material that can be adopted for the third nonlinear wavelength conversion element 5 is BBO, KBBF, and RBBF.

As have been predicted by the simulation, light at 852 nm with the optical power of 10 W or more is expected to yield more than 1 W of output at 213 nm when the second and third wavelength conversion units 400 and 500 described above are utilized.

Following the operational principle mentioned above that focuses on a specific structure for generating DUV light at a wavelength of 213 nm, it is possible to generate the DUV light 51 within 210 nm-225 nm range in the present embodiment. For such an operation, the light 11 at the first wavelength, which is any value within 1.87 μm-2.1 μm, is generated in the first laser source 100, and light 21 at the second wavelength, which is any value within 1.53 μm-1.57 μm, is generated in the second laser source 200. Also for this operation, a thulium-doped laser source or a thulium-doped fiber source may be adopted for the first laser source 100, and a semiconductor laser source, an erbium-doped fiber source, or an erbium/ytterbium-doped fiber source may be adopted for the second laser source 200. The near-infrared light 31 at the third wavelength, generated through an SFM process at the first nonlinear wavelength conversion element 3 in the first wavelength conversion unit 300, may have any wavelength within 841 nm-899 nm. The wavelength of the blue light 41, generated through an SHG process by the second nonlinear wavelength conversion element 4 in the second wavelength conversion unit 400 from the near-infrared light 31, falls within 420 nm-450 nm range. From the blue light 41 at this wavelength range, the DUV light 51 at a wavelength range of 210 nm-225 nm is generated through another SHG process by third nonlinear wavelength conversion element 5 in the third wavelength conversion unit 500.

The DUV laser generation device and light source device of the present disclosure is applicable to any sort of apparatus that utilizes ultraviolet light at a wavelength range, or ~213 nm, that has been realized as a fifth harmonic of the conventional near-infrared laser source at a wavelength of 1.064 μm.

REFERENCE SIGNS LIST 1000 deep ultraviolet laser generation device
100 first laser source
11, 12 light at a first wavelength
13 reflection light
101 seed laser source
101A solid-state laser source
101B fiber laser source
102 injection-locked laser or thulium-doped fiber amplifier
103 seed laser output
105 optical pump source
106 optical pump beam
107 pump optics
108 resonator mirror
109 laser gain medium
110 birefringent filter
111 etalon
112 output coupler mirror
120 semiconductor pump laser
121 high-reflection fiber Bragg grating (HR-FBG)
122 laser gain fiber
123 output coupling fiber Bragg grating (output coupling FBG)
124 output fiber
200 second laser source
21, 22 light at a second wavelength
23 reflection light
300, 300A, 300B first wavelength conversion unit
3 first nonlinear wavelength conversion element
30 external resonator
31, 32 near-infrared light at a third wavelength
33 reflection light
301 input coupler mirror
302, 303, 304 reflective mirrors
305 precision positioning device
306 phase dispersion compensation element
400 second wavelength conversion unit
4 second nonlinear wavelength conversion element
40 external resonator
41, 42 blue light at a fourth wavelength
43 reflection light
401 input coupler mirror
402, 403, 404 reflective mirrors
405 precision positioning device
500 third wavelength conversion unit
5 third nonlinear wavelength conversion element
50 external resonator
51 deep ultraviolet (DUV) light
501 input coupler mirror
502, 503, 504 reflective mirrors
505 precision positioning device The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A deep ultraviolet laser generation device comprising:
    a first laser source of a thulium-doped laser source or a thulium-doped fiber source, the first laser source emitting light at a first wavelength, wherein the first wavelength is a wavelength between 1.87 µm and 2.1 µm;
    a second laser source of a semiconductor laser source, an erbium-doped fiber source, or an erbium/ytterbium-doped fiber source, the second laser source emitting light at a second wavelength, wherein the second wavelength is a wavelength between 1.53 µm and 1.57 µm;
    a first nonlinear wavelength conversion element for generating near-infrared light at a wavelength between 841 nm and 899 nm from the light at the first wavelength and the light at the second wavelength through a sum-frequency mixing process;
    a second nonlinear wavelength conversion element for generating blue light at a wavelength between 420 nm and 450 nm, from the near-infrared light through a second harmonic generation process; and
    a third nonlinear wavelength conversion element for generating deep ultraviolet light at a wavelength between 210 nm and 225 nm from the blue light through a second harmonic generation process.

2. The deep ultraviolet laser generation device according to claim 1,
    wherein the second laser source comprises:
    a single-frequency laser source of the second wavelength; and
    an erbium-doped fiber amplifier or an erbium/ytterbium-doped fiber amplifier for increasing output of the single-frequency laser source.

3. The deep ultraviolet laser generation device according to claim 1, wherein the first laser source is a thulium-doped laser source, and
    wherein the thulium-doped laser source is a thulium-doped solid-state laser source that is injection-locked by a single-frequency laser source.

4. The deep ultraviolet laser generation device according to claim 3, wherein the thulium-doped solid-state laser source is a laser source including at least one of: $Tm:YVO_4$, $Tm:GdVO_4$, $Tm:Gd_xY_{1-x}VO_4$ (where 0<x<1), Tm:YAG, Tm:GGG, and Tm:LuAG.

5. The deep ultraviolet laser generation device according to claim 1, wherein the first laser source comprises:
    a single-frequency laser source of the first wavelength; and
    a thulium-doped fiber amplifier for increasing output of the single-frequency laser source.

6. The deep ultraviolet laser generation device according to claim 1, wherein both of the first laser source and the second laser source are continuous-wave lasers.

7. The deep ultraviolet laser generation device according to claim 1, wherein at least one of the first laser source and the second laser source are single-frequency laser sources.

8. The deep ultraviolet laser generation device according to claim 1, wherein the sum-frequency mixing process takes place inside of an external resonator.

9. The deep ultraviolet laser generation device according to claim 8, wherein the sum-frequency mixing process is a doubly resonant sum-frequency mixing process.

10. The deep ultraviolet laser generation device according to claim 1, wherein at least one of the second harmonic generation processes in the second and third nonlinear wavelength conversion elements takes place inside of an external resonator.

11. The deep ultraviolet laser generation device according to claim 1, wherein at least one of the first-third nonlinear wavelength conversion elements is any of BBO, CLBO, KBBF, RBBF, LBO, KTP, LN, PPLN, PPLT, KN, KTA, RTA, and RTP.

12. A deep ultraviolet laser light source device comprising a deep ultraviolet laser generation device according to claim 1.

* * * * *